United States Patent Office 3,428,664
Patented Feb. 18, 1969

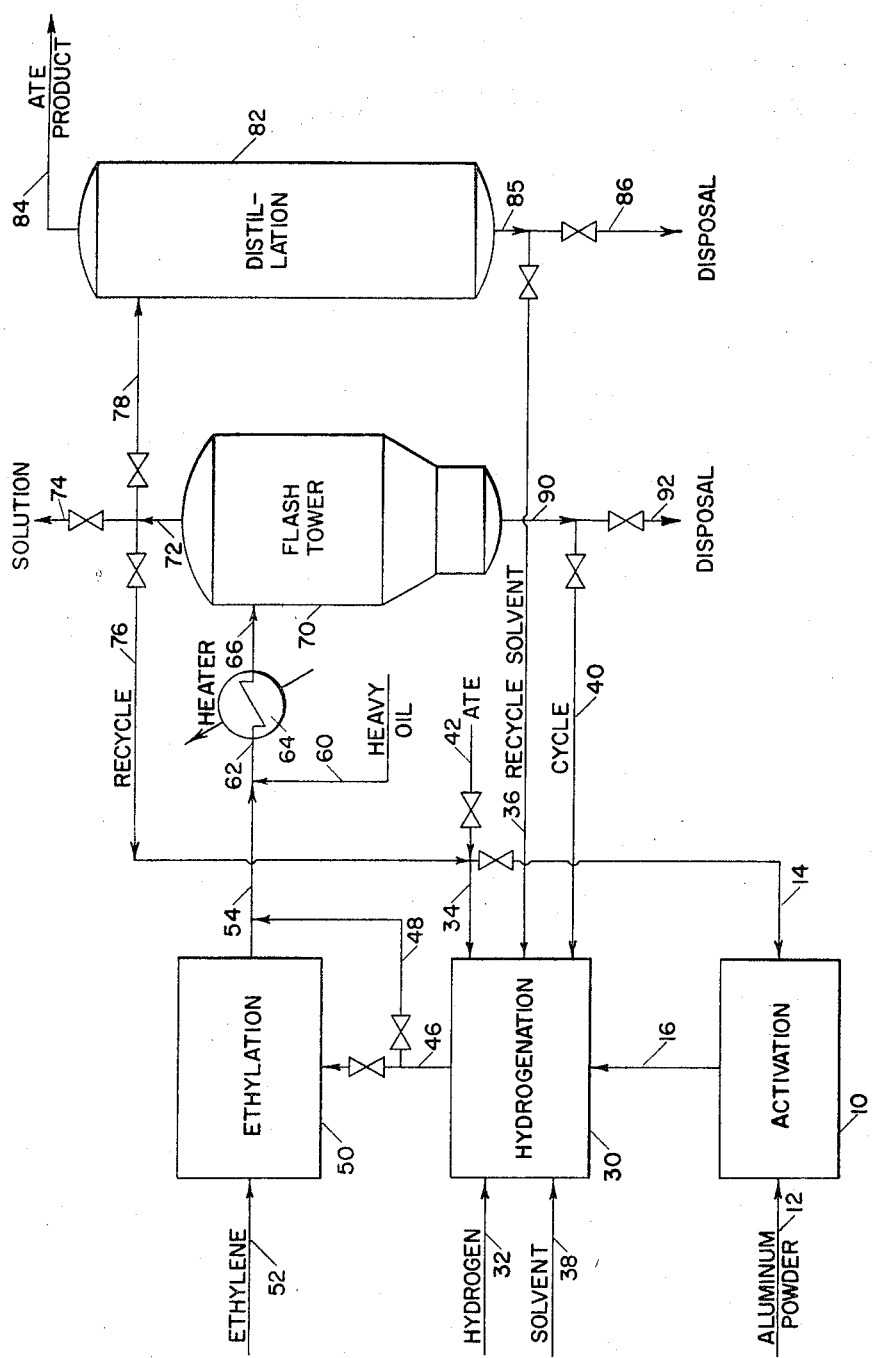

3,428,664
DISTILLATIVE PURIFICATION OF
ALUMINUM ALKYL
Malcolm M. Turner, Houston, Tex., and Daniel F.
Cameron, Ponca City, Okla., assignors to Continental Oil Company, Ponca City, Okla., a corporation of Delaware
Filed Jan. 27, 1965, Ser. No. 428,436
U.S. Cl. 260—448                                                 16 Claims
Int. Cl. C07f 5/06; B01d 3/34

ABSTRACT OF THE DISCLOSURE

Contaminant solids are removed from alkyl aluminum solution by adding thereto a low volatility oil and flashing the alkyl aluminum off to leave a residue of solids in the oil.

DISCLOSURE

This invention relates to aluminum alkyls and particularly to a process for producing high purity aluminum alkyls.

The processes are now available for the preparation of aluminum alkyls, i.e., aluminum alkyl hydrides and aluminum trialkyls, by direct reaction of aluminum metal, hydrogen and aluminum trialkyl. In these processes the aluminum metal is present in very finely divided form. Small quantities, usually less than about 1 weight percent, of solid particles are present in the raw aluminum alkyl stream after a "final" settling operation. These particles are generally less than about 50 microns in size. It has been observed that the particles consist in the main of aluminum, aluminum oxide, titanium, iron oxide and silica.

It is known that some of the compounds present in the solid particles are catalysts for the polymerization of ethylene in the presence of aluminum trialkyl. This is a very undesirable feature in the growth reaction process using ethylene for the production of alkanols.

The presence of the solid particles is objectionable for virtually all chemical uses of aluminum alkyls. At the present time the solid particles are "removed" by filtration or centrifugal separation. These operations are hazardous, expensive and only relatively effective.

An object of the invention is a process for distillative removal of solid particles from aluminum alkyl.

Another object of the invention is the control of the buildup of solid particles within a process for making aluminum alkyl.

Still another object of the invention is the elimination of the recycle of solid particles within a process for making aluminum alkyl.

A further object of the invention is the elimination of solid particles from raw aluminum alkyl to produce a solid-free product.

Another further object of the invention is the elimination of solid particles from raw aluminum alkyl prior to charging this to a growth reaction zone.

Other objects of the invention will become apparent from the detailed description of the invention.

The sole figure shows schematically one embodiment of the process of the invention.

In the process of the invention a raw aluminum alkyl solution containing finely divided solid particles is prepared by reacting aluminum metal, hydrogen and aluminum trialkyl in the presence of a saturated liquid hydrocarbon solvent for aluminum alkyl. Another saturated liquid hydrocarbon having a boiling point higher than the aluminum alkyl and the first solvent is added to the raw solution. In a distillation operation the aluminum alkyl and the first solvent are taken overhead, leaving a bottom fraction consisting essentially of the higher boiling solvent and the solid particles. If a common overhead fraction is taken, this can be distillatively separated into a first solvent fraction, and a high purity aluminum alkyl product fraction.

The invention is described in connection with the annexed figure, which forms a part of this specification. It is to be understood that the figure is largely schematic in nature because the proper items of equipment and operation thereof are conventional to this art. It is to be understood that the invention is not limited to this embodiment but includes modification such as may be readily made by those of ordinary skill in this art.

A raw aluminum alkyl solution containing finely divided solid particles is prepared in the three zones labeled activation zone 10, hydrogenation zone 30 and ethylation zone 50. The operation of these three zones is entirely conventional, and is described in the literature. Particularly suitable descriptions are given in U.S. Patents Nos. 2,787,626; 2,835,689; and 2,952,698 and in Chemical Engineering Progress 58, 85–88, May 1962.

Finely divided aluminum powder or chips is introduced by way of means 12 into activation zone 10. Various activation techniques may be used but a particularly suitable procedure utilizes wetting of the metal with aluminum trialkyl—in this embodiment aluminum triethyl (ATE) from valved line 14. From activation zone 10, the activated aluminum and aluminum triethyl are passed by way of means 16 to hydrogenation zone 30.

In hydrogenation zone 30 the activated aluminum is reacted with hydrogen introduced by way of means 32 and aluminum triethyl, introduced by way of means 34. A first saturated liquid hydrocarbon solvent for aluminum alkyl is present in hydrogenation zone 30. Recycle first solvent is introduced by way of valved line 36 and makeup solvent is introduced by way of line 38. A cycle second solvent stream may be introduced into hydrogenation zone 30 by way of valved line 40. Fresh aluminum triethyl may be introduced by way of valved line 42 and line 34.

The first saturated liquid hydrocarbon solvent must possess a high degree of solvent power for the particular aluminum alkyl present in, and being prepared by the operations of zones 30 and 50. Also, the first solvent must be readily separable by distillation from the aluminum alkyl. The preferred solvents are saturated liquid petroleum fractions. In the case of the aluminum triethyl embodiment described in the figure, the first solvent boils over the range of about 475°–550° F. Examples of suitable solvents include normal saturated paraffinic hydrocarbons such as decane, tetradecane and their higher homologues, saturated naphthenic hydrocarbon oils, petroleum oils, especially acid treated petroleum oils, including white oil, heavy naphthas, suitable kerosene fractions, middle distillates, light gas oils, and other stocks from which olefin and aromatic components have been removed, etc.

Desirable proportions of solvent range from 5–100%, preferably from 10–50% based on the weight of aluminum product alkyl to be obtained. In the embodiment of the figure the first solvent is present in an amount of about 30–80 weight percent.

The solution prepared in hydrogenation zone 30 includes aluminum dialkyl hydride—in this embodiment aluminum diethyl hydride. This stream may be processed according to the invention to produce solid particle free aluminum diethyl hydride, by bypassing ethylation zone 50—by way of valved line 48.

In this embodiment the total liquid stream from hydrogenation zone 30 is passed by way of means 46 into ethylation zone 50. Ethylene is passed by way of means 52 into ethylation zone 50, where it reacts to produce aluminum triethyl. A raw aluminum alkyl solution, including first saturated liquid hydrocarbon solvent, aluminum triethyl, and finely divided solid particles is withdrawn from ethylation zone 50 by way of line 54.

A heavy oil is introduced into this raw solution in line 54 by way of line 60. This heavy oil is a saturated liquid hydrocarbon having a boiling point higher than the highest boiling aluminum alkyl present in the raw solution in line 54, whereby the aluminum alkyl may be distillatively separated from the heavy oil; the heavy oil must also possess the requisite solvent power for the aluminum alkyl. The heavy oil may be selected from any one of the hydrocarbons aforementioned with respect to the first solvent which have the proper boiling point, or boiling point range.

The heavy oil is present in an amount sufficient to produce a liquid bottom fraction in the subsequent distillation operation, which fraction will include essentially all of the solid particles present in the raw solution, in line 54. In general, the heavy oil is present in the new solution present in line 62 in an amount between about 1 and 10 weight percent, based on raw solution in line 54. In this embodiment there is used 5 weight percent of a petroleum fraction boiling over the range of about 650°–850° F. Generally, the heavy oil preferably boils above about 550° F.

The solution in line 62 is passed through a heater 64 and the hot solution is passed by way of line 66 into flash tower 70. It is to be understood that any form of distillative separation which permits vaporization of the aluminum alkyl content of the solution, without appreciable decomposition thereof may be used.

In this embodiment of the figure a vacuum flash system is used to permit vaporization of the aluminum triethyl at a temperature of below about 300° F. Here, the solution enters flash tower 70 at a temperature of about 280° F., and pressure of 10–30 mm. of mercury pressure. At these conditions approximately 95 weight percent of the aluminum triethyl is taken overhead through line 72.

The overhead stream of first solvent and aluminum triethyl may be utilized in some operations as such, and for this purpose is passed by way of valved line 74. This solution is of particular use in the preparation of higher molecular weight aluminum trialkyls by a growth reaction with ethylene; the absence of solid particles reduces side reactions. Recycle solution is passed by way of valved line 76 to zone 30 and/or zone 10.

It is to be understood that a vacuum distillation may be used instead of the flashing operation described. Such a distillation would permit removing a separate solvent rich fraction and a separate trialkyl fraction. In this embodiment high purity aluminum triethyl product is obtained by passing a stream of overhead solution from line 72, by way of valved line 78 into distillation zone 82. In distillation zone 82 an aluminum triethyl product is taken overhead, which is essentially free of first solvent and free of solid particles. This ATE product is passed to storage by way of line 84. The first solvent is removed as a bottom fraction from zone 82 by way of line 85; a recycle solvent stream may be sent to zone 30 by way of valved line 36; or this stream, or a portion thereof may be sent to disposal by way of valved line 86. It is to be understood that the first solvent may be lower boiling than the trialkyl product.

In flash tower 70 a bottom fraction is produced, which contains essentially all of the solid particles, the heavy oil, and a minor amount of aluminum triethyl and first solvent. In this embodiment the heavy oil bottom fraction is approximately 20 weight percent solid material removed from the raw solution, and the heavy oil bottom fraction is withdrawn from tower 70 by way of line 90. A substantial amount of aluminum is present in the heavy oil bottom fraction, and this may be recovered by returning a cycle stream by way of valved line 40 to zone 30. In order to avoid a buildup of solid particles in the system, a portion of the heavy oil bottom fraction is sent to disposal by way of valved line 92.

It is to be understood that the process of the invention may be used with any aluminum alkyl which can be vaporized. However, the process is especially suitable with the lower and medium molecular weight aluminum alkyls, where the alkyl radical has 2–30 carbon atoms. The process is especially attractive with the aluminum trialkyls having 2–6 carbon atoms in each alkyl group.

Thus having described the invention, what is claimed is:

1. In a process comprising preparing a raw aluminum alkyl solution in a first saturated liquid hydrocarbon solvent for said aluminum alkyl from reactants comprising aluminum metal, hydrogen, and aluminum trialkyl, said raw solution containing finely divided solid particles, the improvement which comprises:
    (a) adding to said raw solution a second saturated liquid hydrocarbon having a boiling point higher than said aluminum alkyl and said first solvent to form another solution, and
    (b) distillatively removing said aluminum alkyl and said first solvent to recover a fraction consisting essentially of said second liquid hydrocarbon solvent and said solid particles.

2. The process of claim 1 wherein said first saturated liquid hydrocarbon boils above said aluminum alkyl so as to be distillatively separable therefrom.

3. The process of claim 2 wherein said first hydrocarbon is a petroleum fraction.

4. The process of claim 1 wherein said second saturated liquid hydrocarbon is a petroleum fraction.

5. The process of claim 1 wherein said second saturated liquid hydrocarbon is present in an amount between about 1 and 10 weight percent, based on said raw solution.

6. The process of claim 1 wherein said raw solution consists essentially of aluminum dialkyl hydride.

7. The process of claim 1 wherein said raw solution consists essentially of aluminum trialkyl and said reactants include an alpha-olefin.

8. The process of claim 7 wherein said distilled aluminum alkyl and said distilled first solvent are recycled, at least in part, to said reaction zone.

9. The process of claim 1 wherein said recovered second solvent fraction is at least, in part, cycled to said reaction zone.

10. In a process comprising:
    (1) preparing a raw aluminum trialkyl solution by reacting aluminum metal, hydrogen, aluminum trialkyl and ethylene in the presence of a first saturated liquid hydrocarbon solvent, whereby said raw solution contains finely divided solid particles, said alkyl radical having 2–30 carbon atoms, and said solvent and said aluminum trialkyl being distillatively separable the improvement comprising;
    (2) adding to said raw solution a second saturated liquid hydrocarbon solvent having a boiling point higher than said first solvent and said trialkyl, to form another solution;
    (3) distillatively removing aluminum trialkyl and first solvent, essentially free of solid particles, to recover a bottom fraction consisting esentially of said second hydrocarbon solvent and said solid particles.

11. The process of claim 10 wherein at least a part of said trialkyl and said first solvent are recycled to said reaction zone.

12. The process of claim 10 wherein at least a part of a common overhead fraction is distillatively separated to recover an essentially pure aluminum trialkyl product.

13. The process of claim 10 wherein said aluminum trialkyl is aluminum triethyl.

14. The process of claim 13 wherein said first solvent is a petroleum fraction boiling over the range of about 475–550° F.

15. The process of claim 14 wherein said second liquid hydrocarbon solvent is a petroleum fraction boiling above about 550° F.

16. The process of claim 15 wherein said second liquid hydrocarbon solvent boils over the range of about 650°–850° F.

References Cited

UNITED STATES PATENTS

| | | | |
|---|---|---|---|
| 2,787,626 | 4/1957 | Redman | 260—448 |
| 2,927,103 | 3/1960 | Schneider | 260—448 XR |
| 2,952,698 | 9/1960 | Neal et al. | 260—448 |
| 3,104,252 | 9/1963 | Radd et al. | 260—448 |
| 3,207,770 | 9/1965 | Ziegler et al. | 260—448 |
| 3,071,635 | 1/1963 | Glaser et al. | 203—68 XR |
| 3,311,545 | 3/1967 | Rasmussen | 203—52 XR |

HELEN M. McCARTHY, *Primary Examiner.*

H. M. S. SNEED, *Assistant Examiner.*

U.S. Cl. X.R.

203—52, 68, 70